US006836754B2

(12) United States Patent
Cooper

(10) Patent No.: US 6,836,754 B2
(45) Date of Patent: Dec. 28, 2004

(54) BIOMECHANICAL SYSTEM DEVELOPMENT OF A RESTRAINT SYSTEM

(75) Inventor: John Cooper, Oxford, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 598 days.

(21) Appl. No.: 09/774,924

(22) Filed: Jan. 31, 2001

(65) Prior Publication Data

US 2002/0103549 A1 Aug. 1, 2002

(51) Int. Cl.[7] .............................. G06F 7/48; G06F 9/45
(52) U.S. Cl. ................................ 703/8; 703/2; 703/22; 717/104; 701/45; 180/272; 180/287
(58) Field of Search .......................... 280/735, 728.1, 280/801.1; 703/2, 8, 22; 717/100, 104; 701/36, 45; 297/216.1; 180/271, 272, 274, 287

(56) References Cited

U.S. PATENT DOCUMENTS

| 5,583,771 A | 12/1996 | Lynch et al. .......... 364/424.045 |
| 5,636,424 A | 6/1997 | Singer et al. ............ 27/407.01 |
| 5,695,242 A | 12/1997 | Brantman et al. ....... 297/216.1 |
| 6,422,595 B1 * | 7/2002 | Breed et al. ................ 280/735 |
| 6,459,973 B1 * | 10/2002 | Breed et al. ................... 701/45 |

OTHER PUBLICATIONS

0–7803–5674–8/99, Proceedings of the First Joint BMES/EMBS Conference Serving Humanity, Advancing Technology—Adaptation of Integrated Restraint (IR) Technology for use in the Wheelchair Transportation Industry.

Myron Ginsberg/James P. Johnson, Benchmarking the Performance of Physical Impact Simulation Software on Vector and Parallel Computers.

0277–17–16/995 Michael J. Potel, Applications—At Oak Ridge, a Car Crash on the World Wide Web.

Vol. 7, No. 2, Jun. 1999, Transactions on Rehabilitation Engineering/Computer Simulation and Sled Test Validation of a Powerbase Wheelchair and Occupant Subjected to frontal Crash Conditions.

CSE Industry by Ren–Jye et al. Robustness Optimization for Vehicular Crash Simulations.

* cited by examiner

Primary Examiner—Russell Frejd
(74) Attorney, Agent, or Firm—Markell Seitzman

(57) ABSTRACT

Disclosed is a safety restraint design controller for controlling the design of a safety restraint system so that a predetermined desired level of an occupant's response (89) is produced. The controller has a database (85) for storing an occupant restraint factor response model (90). The model (90) interrelates at least one predetermined restraint factor (88) with the occupant response (89), the restraint factors having a level that is indicative of setting values for controlling the safety restraint design. A database engine connected to the database (85) determines a level for the occupant response (89) based upon the model and upon a first level of the restraint factors. An optimizer is connected to the database engine for determining a second level of the restraint factors (88), which produces the desired level of the restraint factors (88), which produces the desired level of the occupant response based upon the desired level of the occupant response (89) from the database engine; whereby the safety restraints design is controlled based upon the determined second level of the restraint factors that produces the desired level of the safety response.

17 Claims, 10 Drawing Sheets

BIOMECHANICAL SYSTEM DEVELOPMENT OF A RESTRAINT SYSTEM

BACKGROUND OF THE INVENTION

1. Field of the Invention

The present invention relates generally to the design of a safety restraint system and more particularly to a design methodology and design of experiments system for the design and development of a safety restraint system for an automobile.

2. Description

New government requirements have significantly increased the number of test scenarios under which a safety restraints system must be evaluated. The new rules amend the occupant crash protection standards to require that future air bags be designed to create less risk of serious air bag induced injuries, particularly for small women and young children. Future restraint systems must further provide improved frontal crash protection for all occupants, by means that include advanced air bag technology. To achieve these goals, a wide variety of new requirements have been added including test procedures, injury criteria, and the use of an assortment of new anthropomorphic dummies. These new requirements, coupled with a shortened vehicle development cycle, significantly increase the need for improved design methodologies.

Specific injury criteria for a number of anthropomorphic dummies have been set. More specifically, head injury criteria (HIC), neck injury criteria (including tension, compression and flexion), thoracic criteria (including chest acceleration and chest deflection) and femur axial loads have been set for: hybrid III mid-sized male, hybrid III small female, hybrid III 6-year-old child, hybrid III 3-year-old child, and 12-month-old infant anthropomorphic dummies. For any given injury criteria value, a statistical probability of a particular injury severity can be determined. By using these injury criteria to design a restraints system, it is possible to statistically determine for a given occupant and crash situation what the likelihood of injury will be and therefore evaluate the effectiveness of changes to a restraint system. Prior to the incorporation of the new requirements, manufacturers were required to design air bag systems using the hybrid III mid-sized male. Due to the often complicated nature of these systems and crash events, it is often not possible to design the system for protecting all possible occupants for all possible crash situations.

While the theory of safety restraints design and its applications to various restraint components has advanced considerably in the past decade, the bulk of that knowledge has repeatedly stayed within the laboratory. This has mainly resulted from the obtuse nature of the laboratory-derived knowledge and the requirement that the engineer or technical expert must be integrally involved in applying the theoretical knowledge to a given unexpected crash situation.

Significant advancements have been made in testing methodologies and computer modeling of restraints systems. As is known in the restraints community, small modifications to the output of various restraint components often lead to significant changes in injury responses in occupants in varying crash conditions. As such, changes to the vehicle, as the vehicle progresses through its development, often require that changes be made to the restraints system. Using previous methodologies, this would significantly increase the amount of testing and computer simulations that must be run to verify the response of the system to changes in the vehicle structure. Should the testing show that test results for a given occupant would fall out of acceptable government or vehicle manufacturer specifications, a significant amount of redesign and re-testing would be necessary. Such recursive changes required to bring the system in compliance for one class of occupants can quickly take the response levels far away from acceptable limits for other occupants.

Engineers have performed complex design of experiments to study the interrelationships between automotive safety restraint components and occupant responses. This work has produced mathematical models that are typically very intricate, requiring three-dimensional depictions of the inner relationships (as shown for example in FIG. 1).

The various surfaces of FIG. 1 show exemplary interrelationships between three crash factors and one occupant response. The crash factors may be the output of an air bag inflator, such as the pressure or temperature, the stiffness of a knee bolster, or a seat belt's elasticity. The occupant's response may be an attribute of injury criteria such as chest deflection. FIG. 1 illustrates how changes in the restraint factors affect the occupant's response. For example, surface 20 shows that parameters of the restraint factors produce a response value of "30". As shown in FIGS. 2a–2b, contour plots can be used to depict inter-relationships between restraint factors and the occupant responses in a two-dimensional view.

To use the experimental results in a restraints system, the contour plots were studied to determine the optimal restraint component factors that would achieve a particular occupant response. To determine the restraint factors needed to achieve a desired level for two occupant responses, the contour plots for two occupant responses were placed atop of each other (see FIG. 2c); thereupon restraint factors were determined based upon the area, of both desired occupant response levels. The difficulty of analyzing the contour plots dramatically increases with the number of occupant restraint factors and responses involved. The new government regulations have significantly increased these occupant restraint factors by increasing the number of crash scenarios and occupants to be tested, making use of contour plots untenable.

The design of experiments approach was then used in the ever-changing vehicle environments. When the restraint factors and responses had to be changed from the tested initial laboratory configuration, the design of experiments determined a set of optimal restraint factors. The unwieldy manner of the contour plots to effectively address the ever-changing restraint factors and responses within a vehicle's restraint system development, hindered the ability of design of experiments to assist in modifying the restraint factors. Accordingly, modifications to the restraint factors within the design and development of a restraints system to achieve the desired occupant responses was an art form. This art form was to be learned from years of experience in controlling the restraint equipment within a vehicle. Due to these reasons, the development of a restraints system lacks the effective use of the design of experiments approach for controlling a restraints system, especially in view of the reduced cycle time needed in the development of an automobile.

SUMMARY OF THE INVENTION

As such, a computer implemented method for designing a safety restraints system so that a predetermined desired level of occupant responses is produced is disclosed. This method includes the steps of storing an occupant restraint factor response model in a computer storage media. The model relates at least one predetermined restraint factor having a level, which is indicative of an output for components within the design of the restraint system, with an occupant's response. The methodology determines the level of an occupant's response based upon the model and upon a first level of restraint factors. The model then determines a second level of the restraint factors, which produce the desired level of the occupant's response based upon the determined level of restraint factors. In addition, the system modifies the restraints system based upon the determined second level of the restraint factors, which produces the desired level of the occupant response. This modification utilizes optimization techniques such as a simplex methodology.

Further disclosed is a computer-implemented method for controlling the design of an occupant restraints system so that a predetermined desired level of occupant responses is produced, the system having the steps of: storing an occupant restraint factor response model in a computer storage media. The model relates at least one predetermined restraint factor with the occupant response, the restraint factors having a level that is indicative of setting various values for controlling the design of the restraints system. Next, the system establishes at least one constant for the model, based upon the desired value of the vehicle occupant's response. Next, the system determines the level of the restraint factors, which produce the desired level of restraint response, based upon the model having the established constraint. Finally, the system controls the design of the occupant restraint system based upon the determined level of the restraint factors, which produce the desired level of the occupant's response.

Further disclosed is a safety restraint design controller for controlling the design of a safety restraints system so that a predetermined desired level of occupant's response is produced. The controller has a database for storing an expert restraint factor response model, the model interrelating at least one predetermined restraint factor with the occupant response, the restraint factor having a level which is indicative of setting values for controlling the safety restraint design. A database engine is connected to the database for determining a level for the occupant response based upon the model and upon the first level restraint factors. In addition, an optimizer is connected to the database engine for determining a second level of the restraint factors, which produce the desired level of the occupant response based upon the desired level of the occupant response from the database engine. Whereby the safety restraint's design is controlled based upon the determined second level of the restraint factors, which produce the desired level of the safety response.

Further disclosed is a system design methodology, which is broken into four general stages: pre-design verification; design verification; pre-product validation; and product validation. Each of these stages incorporates vehicle crashes, sled testing, numerical analysis, and sensor development. The preferred proposed development methodology requires 5 (five) crash test phases, 7 (seven) sled test phases, and 4 (four) out-of-position occupant option phases. Extensive computer simulation is conducted between the general stages using a design of experiments method. Each of the design of experiments produces polynomial equations that can be used to calculate all of the occupant responses for every test condition. A complete fire/no fire matrix is generated from the design of experiments after each phase of simulation. A biomechanical algorithm is developed based on the design of experiments and the fire/no fire matrix. The restraint factors and occupant responses from each phase of the vehicle crashes and sled tests are used to confirm the accuracy and tune the polynomial equations and the fire/no fire matrix.

Further disclosed is a method of providing and selecting from a menu on the display in a restraints controller. The method includes retrieving a set of menu entries for a menu, each menu entry representing an occupant restraint characteristic. The set of menu display options is displayed, on a display; where the controller receives a menu entry selection signal indicative of the selection device pointing at a selected menu entry from the set menu entries. In response to the signal, the controller performs a search of a database for injury data corresponding to the occupant response represented by the selected menu entry.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

The following description of the preferred embodiment concerning the design and development of a safety restraints system is exemplary in nature and is not intended to limit the invention or its application or uses. Moreover, while the present invention is described in detail below generally with respect to a vehicle air bag and seat belt system, it will be appreciated by those skilled in the art that the invention is clearly not limited to attachment only to these components and may be applied to various other structures which have an actuatable safety restraint device, as further discussed herein.

Figure 1:
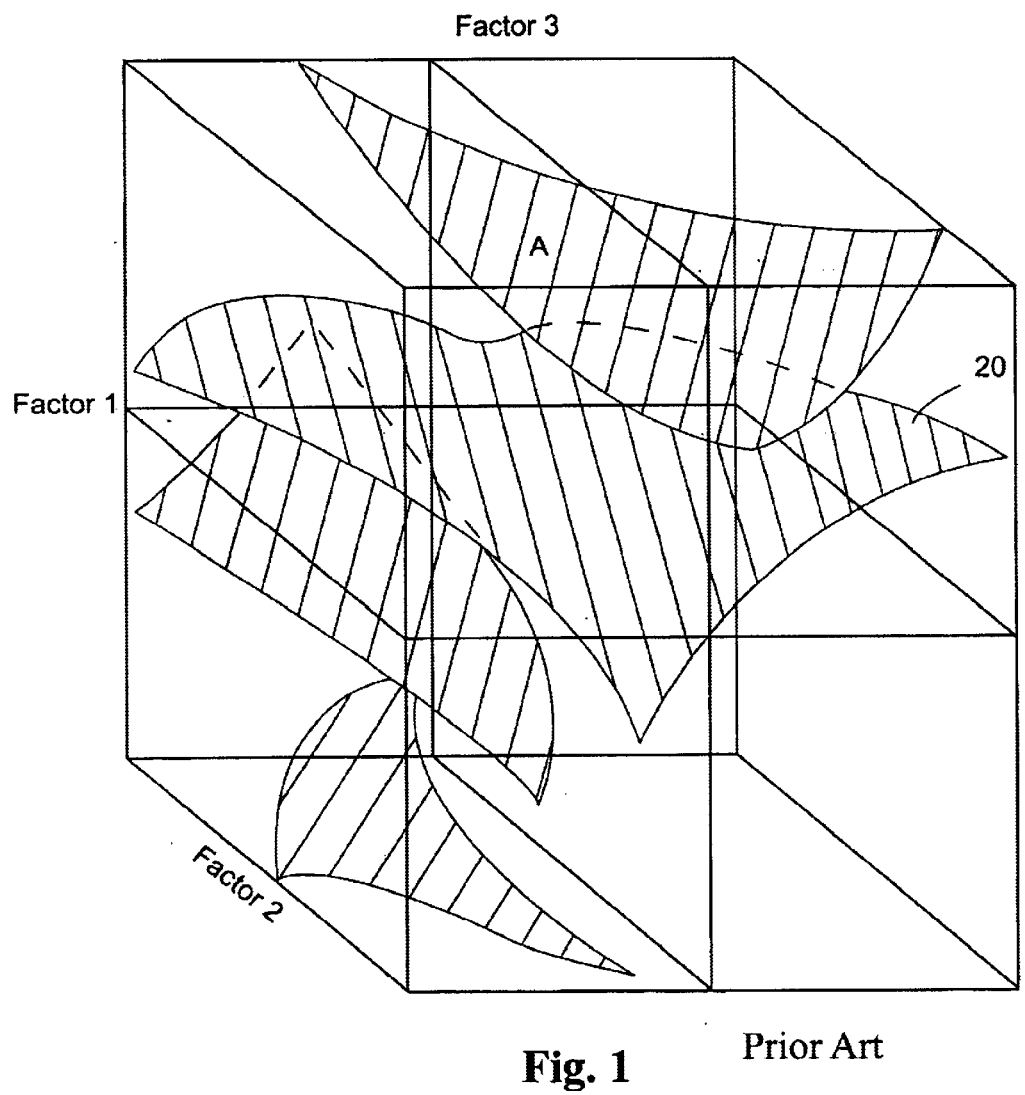
FIG. 1 is a three-dimensional graph depicting several restraint factor-responses as used in a conventional safety restraint design.
Figure 2B:
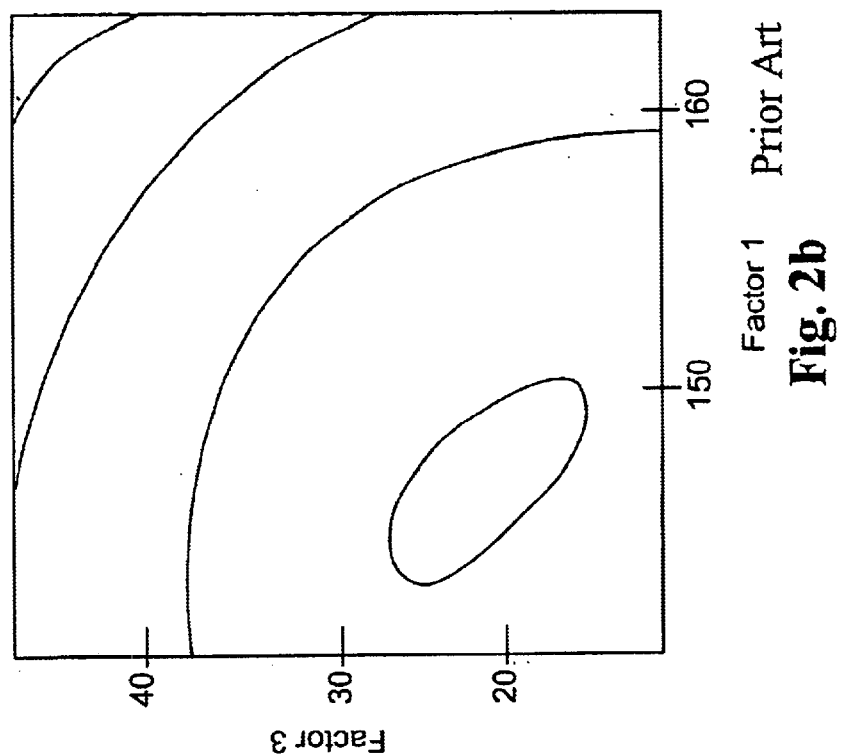
FIGS. 2a–2c are contour plots of the restraint factor-response interrelationships as used in the conventional safety restraints art.
Figure 2A:
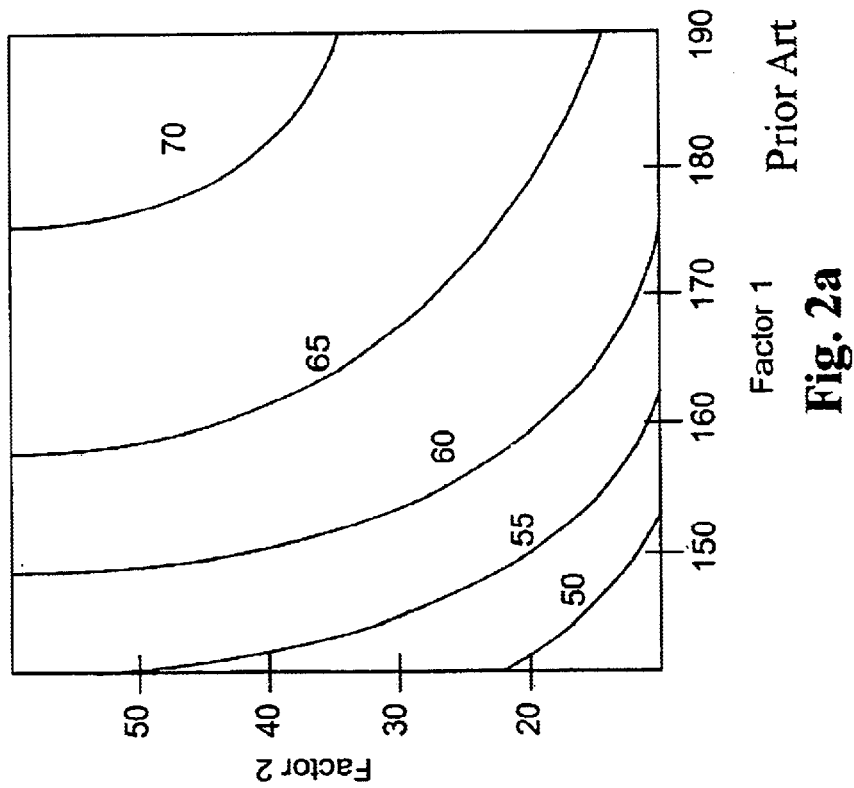
Figure 2C:
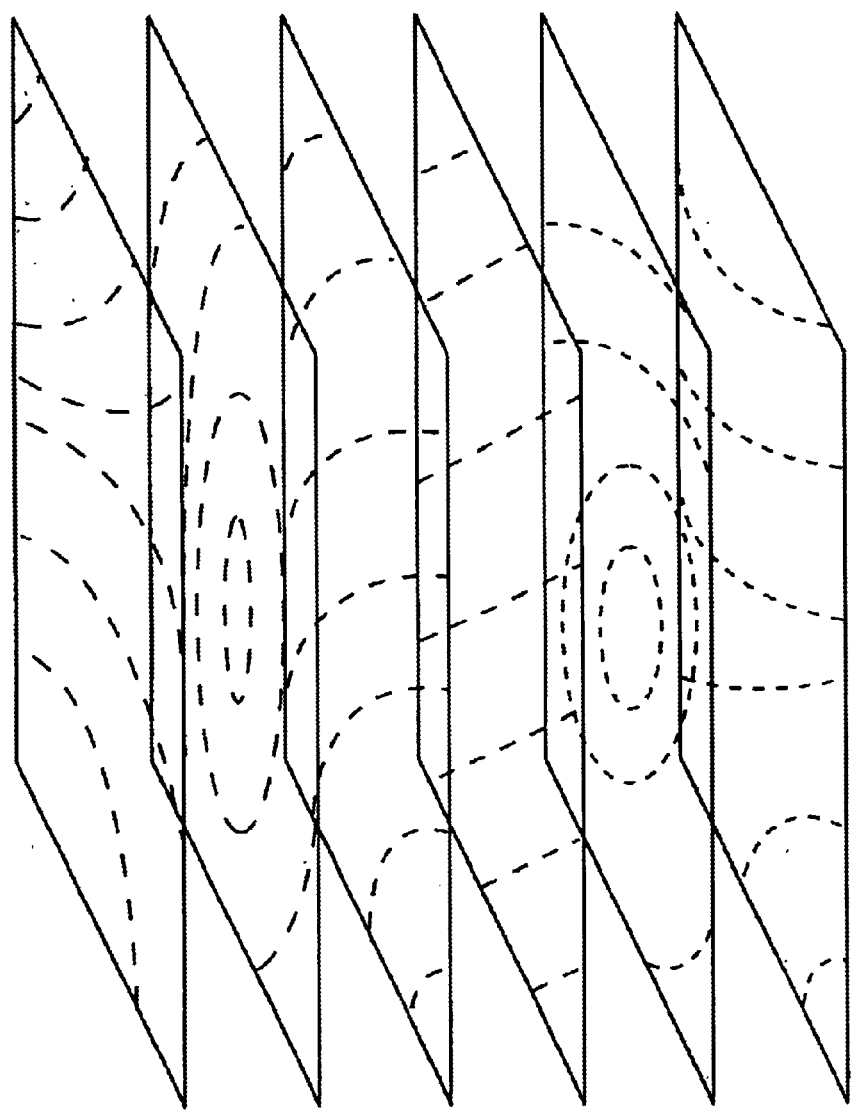
Figure 3:
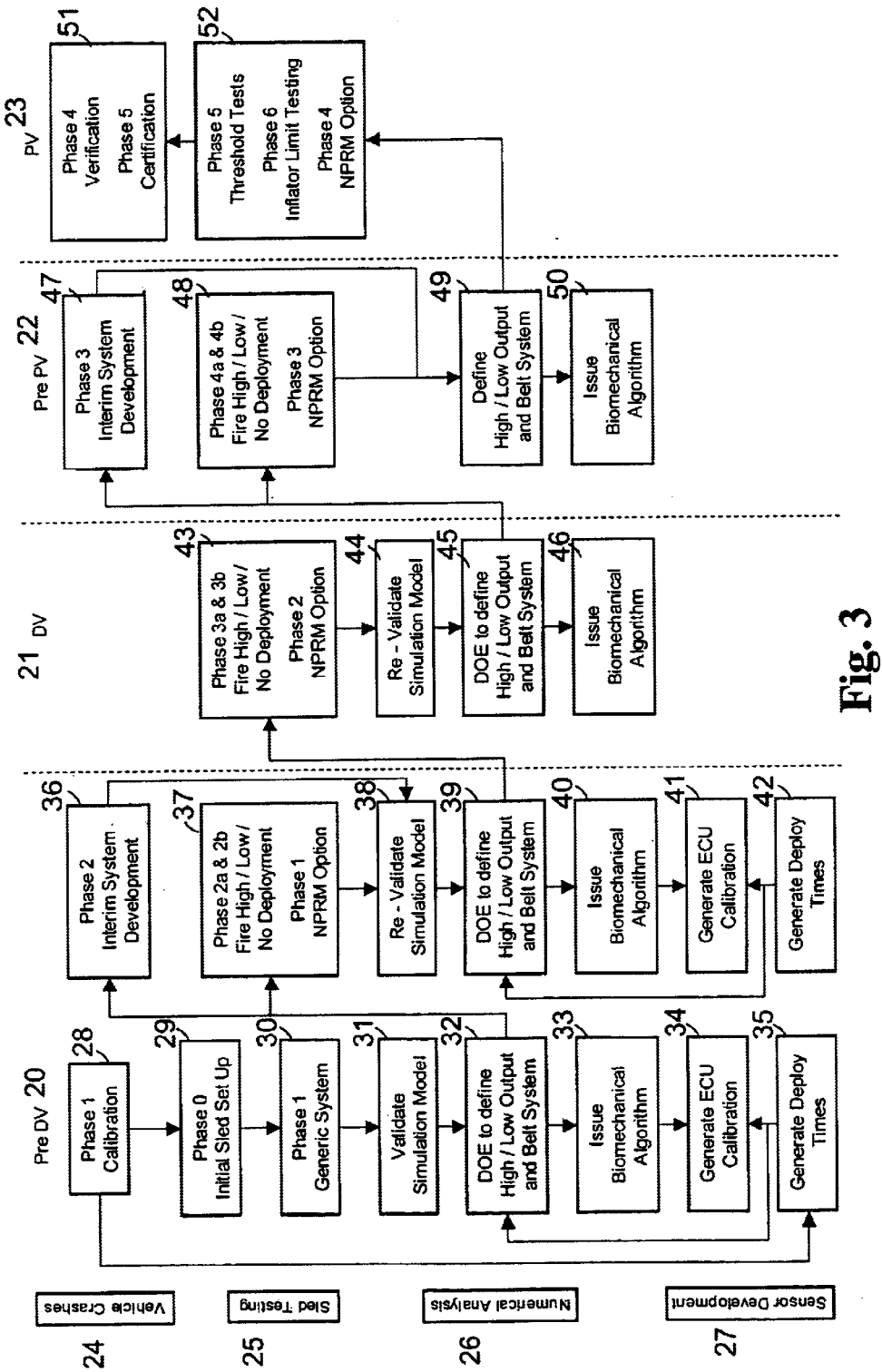
FIG. 3 is a flowchart representing the biomechanical system development.

FIG. 3 is a flowchart representing the biomechanical system development which is divided into four distinct development stages: pre-design verification (pre-dv) 20, design verification (dv) 21, pre-product validation (pre-pv) 22, and product validation (pv) 23. Each distinct development stage contains four primary development analysis tools. These analysis tools include vehicle crashes 24, sled testing 25, numerical analysis 26, and sensor development 27.

The pre-dv stage 20 begins with a vehicle crash. In the phase 1 calibration 28, a prototype vehicle or a vehicle of a similar body type is outfitted with a number of sensors and anthropomorphic dummies. The prototype vehicle is then crashed into a fixed barrier at a given velocity. Data is collected from the phase 1 calibration 28 and used to design the phase 0 initial sled setup 29. The phase 0 initial sled setup 29, which is comprised of approximately 12 sled tests, is used to develop the system design for belted and unbelted conditions in conjunction with multiple levels of crash severity. The sled testing 25 can be completed independently of sensor development 27 and/or used to assist sensor development 27. Data from the Phase 1 calibration 28 is used by a sensor development team to generate deployment times 35 for the various restraint devices, such as air bag inflators and seat belt pretensioners.

Once Phase 0 has been completed, Phase 1 generic system 30 sled testing can be conducted. Phase 1 generic system sled testing 30 comprises approximately 10 sled tests, which are done in a body in white, which more closely represents an actual vehicle environment and hardware. Data from the phase 1 generic system sled testing 30 is used to validate the simulation model 31 of the numerical analysis 26. Once the computer model has been validated, a design of experiments 32 is conducted to define the outputs of the various restraint components, as well as specifying hardware specifications such as the seat belt's elongation or the knee bolster's stiffness. This design of experiments 32 takes into account all of the various occupant types and in and out-of-position testing as required by government regulations and customer specifications and defines a polynomial equation, which defines the occupant response based on component parameters and crash/occupant information.

The design of experiments 32 uses the polynomial equation to define high/low outputs, belt system and thresholds for use with the biomechanical algorithm 33. The biomechanical algorithm 33 is used in conjunction with the generated deployment times/speeds 35 to confirm an ECU calibration 34. This information is then re-verified in the design of experiments 32 to define the initial high/low outputs and belt system.

The initial restraint parameters as defined by the DOE in process block 32 are used in the Phase 2 interim system development crash test 36 and Phase 2a and 2b. Preliminary velocities for high/low/no fire thresholds are set. Initial out-of-position testing is then conducted and used to validate/tune the DOE generated polynomial equations and biomechanical algorithm. At this point, the first designs arising from the DOE are incorporated into prototype vehicles and tested 36. Sled testing 37 in phase 2a and 2b is now conducted with pre-design validated components such as the steering wheel's steering column, the knee bolster structures, and seats. Results from the phase 2 interim system development vehicle crash 36 and the phase 2a and 2b sled testing are used to re-validate and adjust the simulation model in process block 38. The validation model is then rerun in a design of experiments in process block 39 to redefine the high/low outputs and belt system, as well as other restraint system factors for a given restraints system. Process block 40 then issues a new biomechanical algorithm, which is used by the sensor development team to confirm ECU calibration in process block 42. This information is then read into the design of experiments in process block 39 to redefine the high/low outputs and belt systems. Based upon the outputs from the design of experiments 39, the system design is finalized and produced. This includes all outputs such as inflator and pretensioner output and thresholds, as well as systems and hardware such as seats, brackets, seat belt elongation, and bolster stiffness.

Components meeting the specifications as directed by the design of experiments in process block 39 are produced and incorporated into sled testing Phases 3a and 3b 43 of the design validation phase 21. In process block 43, Phases 3a and 3b test the fire high/low/no deployment levels and phase 2 of the out-of-position testing are conducted. Results of this testing are then used to re-validate the simulation model in process block 44. The re-validated simulation process model 44 is incorporated by process block 45 into the design of experiments to once-again redefine the high/low outputs and belt systems of the vehicle via the biomechanical algorithm.

In process block 46, the DOE redefines and issues a new biomechanical algorithm. System components designs that require change are changed and incorporated into the pre-pv 22 stage. Components with a new design are re-tested in the phase 3 vehicle crash 47, as well as in the Phase 4 and 4b for the sled testing 48 of the pre-pv stage 22. Results from the pre-pv and phase 3 vehicle crashes, which contain production intent components, are re-introduced into the DOE in process block 49 to finalize and recheck the response of the system. The response of the DOE is incorporated into the biomechanical algorithm to finally determine and check the restraint system.

Once the design of the vehicle's restraint system is finalized, the components are checked in the product validation Phase 23. Phase 4 verification and Phase 5 certification barrier testing is then conducted at block 51. This includes testing for FMVSS 208 requirements as well as NCAP testing. Phase 5 threshold response tests, Phase 6 inflator limit testing, and out-of-position sled tests are conducted on the vehicle sled 52.

Figure 4:
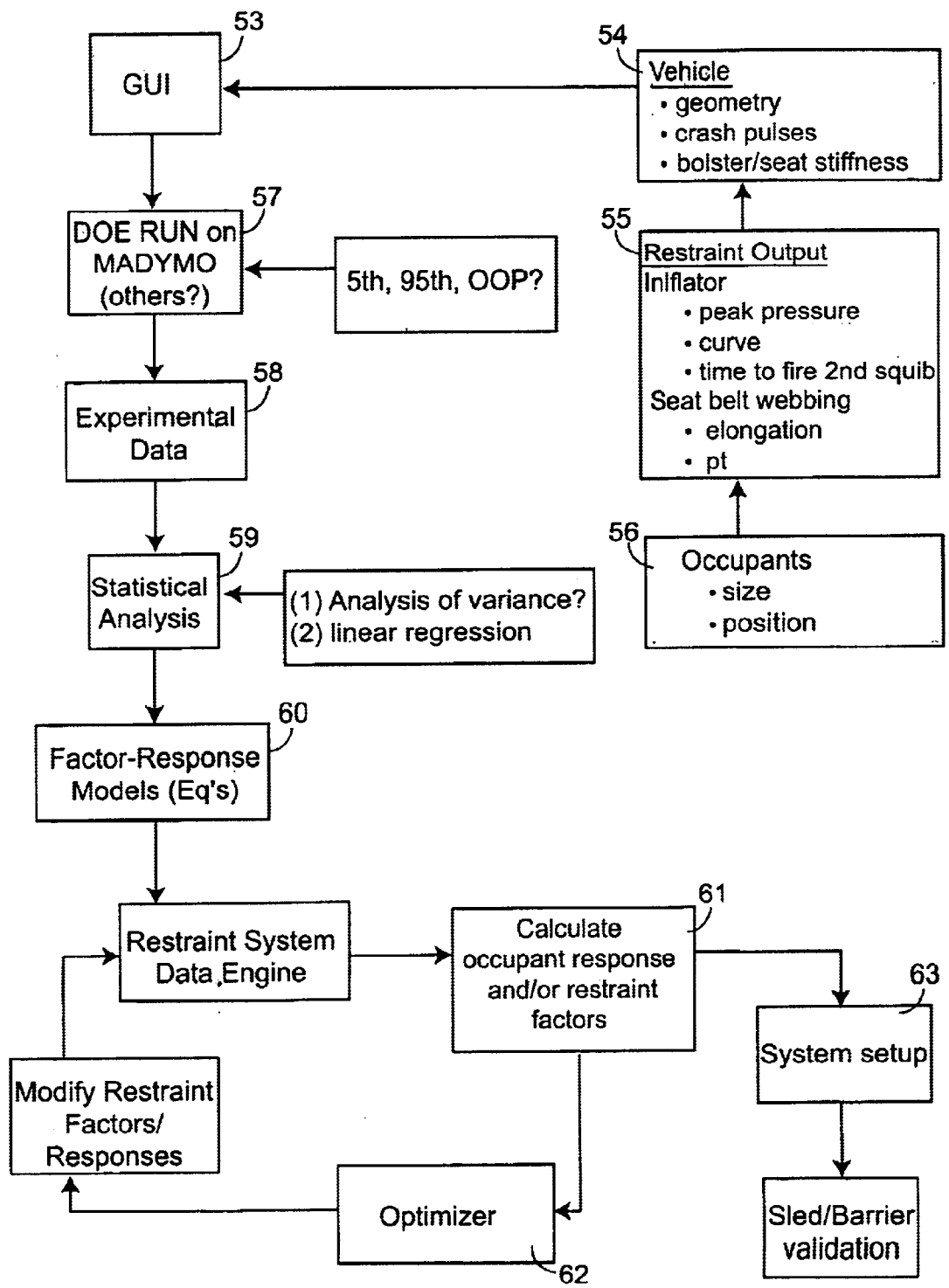
FIG. 4 is a flowchart showing the computerized design of experiments optimizer of the current invention.

FIG. 4 is a flowchart showing the computerized design of experiments optimizer of the current invention. Shown is the graphical user interface (GUI) 53, which is capable of receiving approximately 350 inputs directed towards those parameters necessary for the design of experiments. The GUI 53 receives vehicle input data, which includes the vehicle's geometry, crash pulses or numerous crash situations including frontal and angular, and vehicle interior data such as the bolster and seat stiffness. The GUI 53 further receives information on the restraints systems 55. This includes a range of values for items such as an air bag's inflator, including the pressure, pressure vs. time for, and time to fire the second squib. Further included are restraint factors such as seat belt webbing elongation and whether tensioners are being used. The GUI 53 further allows for the importation of various tested occupant data 56 including the size and position location of the occupant within the vehicle. Sizes include 5th, 50th, 95th in belted and unbelted conditions, six-year-old hybrid III, as well as a twelve-month anthropomorphic dummy.

Process block 57 receives data from the GUI 53 and runs a MADYMO model. The DOE generates in process block 57 a data deck of information or experimental data 58. Process block 59 performs a statistical analysis such as analysis of variance or linear regression on the data within the data deck. Upon completion of the statistical analysis, the data is ready to be post processed by the graphical output interface or GOI. It is possible by using the graphical output interface to remove variables from the equations without rerunning the entire optimization of the design of experiments. Once the determination is made as to which variables are important and will be used in the final system equations, equations are brought together and lumped into a single equation or factor response model in process block 60. The system in process block 61 calculates the occupant response and restraint factors based on the polynomial equations generated in process block 60. It is possible and optional, to use an optimizer in process block 62 to optimize the restraints systems. Generally, the system is not, however, utilized to "optimize" the overall system. The system is "generalized" to meet the best overall occupant restraint for the highest number of occupants possible. Statistical accident data such as data collected by NHTSA can be used to determine appropriate risk factors to reduce overall accident injuries. Once the system factors are used to determine items such as the inflator outputs and thresholds, data is then utilized to develop a biomechanical algorithm. The biomechanical algorithm defines, based on the occupant injury numbers and the vehicle sensing system, the actuation of the specific restraint components.

The restraint system factors as developed by the biomechanical system development regime can be used to define a biomechanical algorithm. A biomechanical algorithm is an algorithm that defines the threshold speeds and response of vehicle components in the event of a vehicle crash. The biomechanical algorithm further defines the output parameters for the components of the restraint devices.

Figure 5:
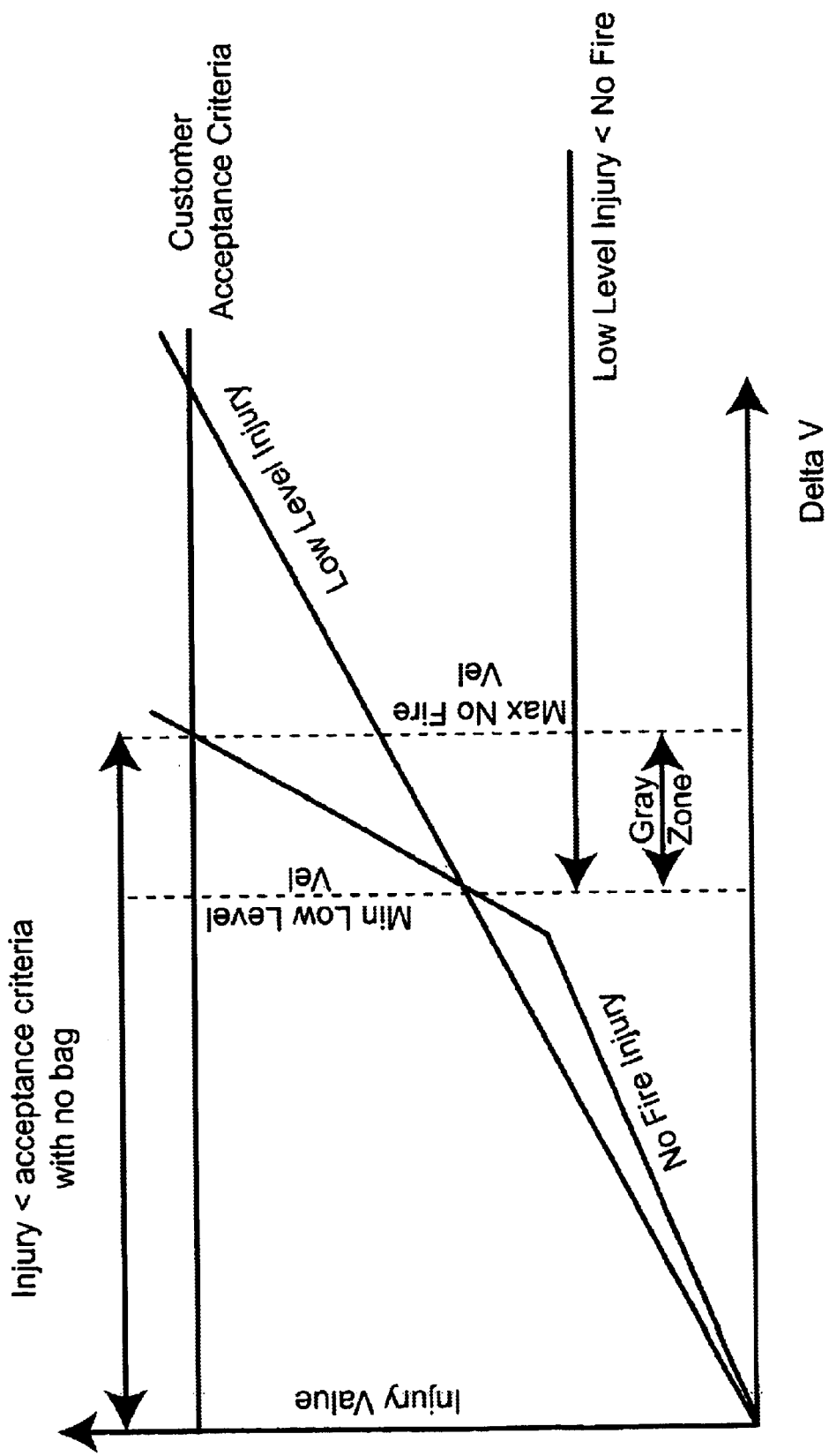
FIG. 5 is a dual stage design methodology utilizing a biomechanical gray zone.
Figure 6:
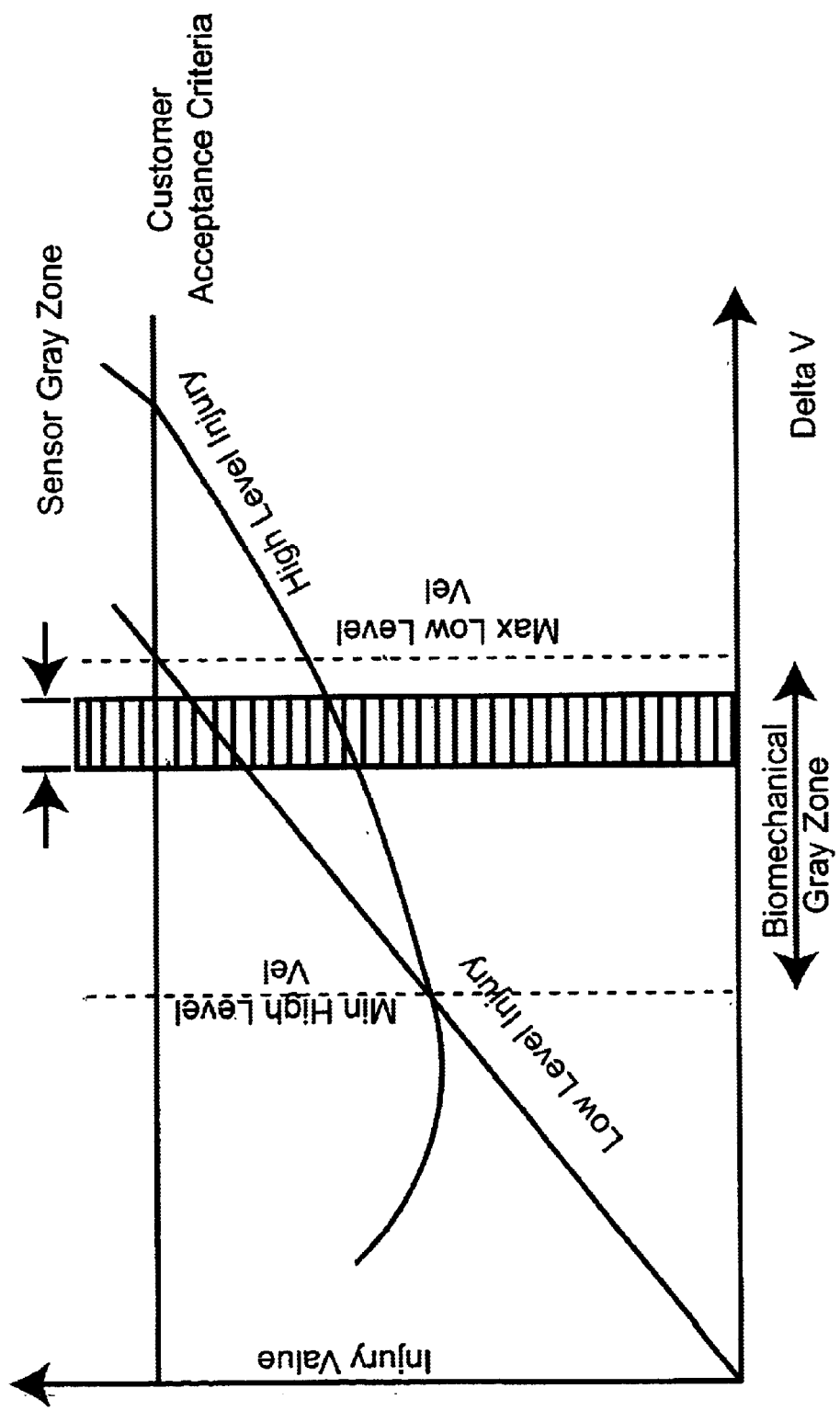
FIG. 6 is a dual stage design methodology depicting the biomechanical gray zone and sensor gray zone.

FIGS. 5 and 6 are a dual stage design methodology utilizing a biomechanical gray zone. FIG. 6 is a dual stage design methodology depicting the biomechanical gray zone and sensor gray zone. Details of how the dual stage design methodology uses the biomechanical gray zones and sensor gray zones is best described in U.S. patent application Ser. No. 09/578,822, incorporated herein by reference.

Figure 7:
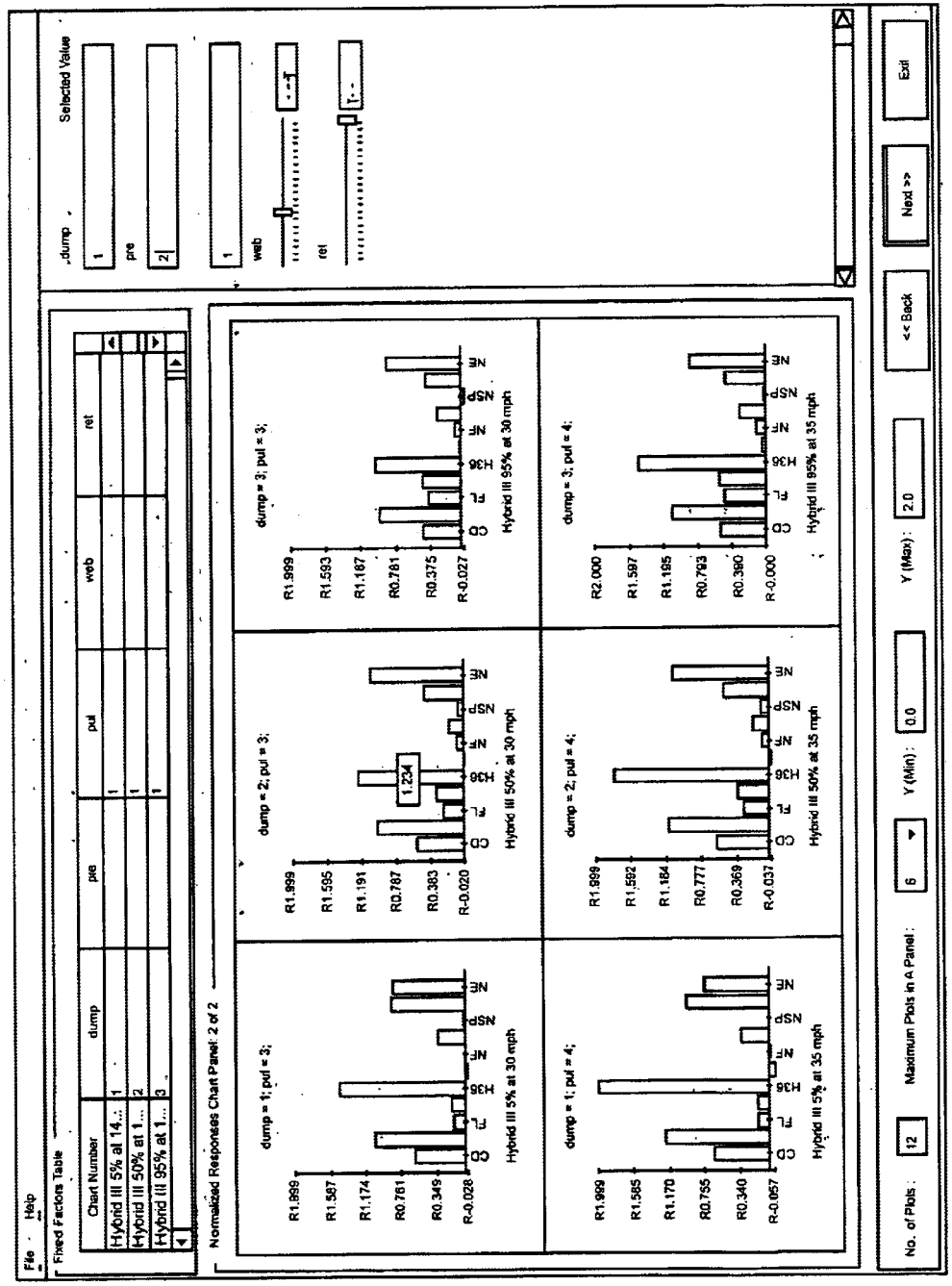
FIG. 7 depicts an output of one link on the outputs of the design of experiments graphical user interface.

FIG. 7 depicts the output of one link on the outputs of the design of experiments graphical output interface. One specific useful feature is the ability to click on a specific occupant such as the 95th percent driver and a frontal rigid barrier impact and determine the injury responses for that occupant. The responses shown for a given occupant represent the point when one or more occupant responses fall outside of an acceptable level. By placing the cursor onto a graph, the system provides the user with the variable (for example inflator tank pressure) that most significantly affects the out-of-bounds occupant response. The user can change the values of this variable by moving the variable slide. Upon doing so, the processor recalculates the occupant responses and thresholds for all occupants in all crash scenarios.

Figure 8:
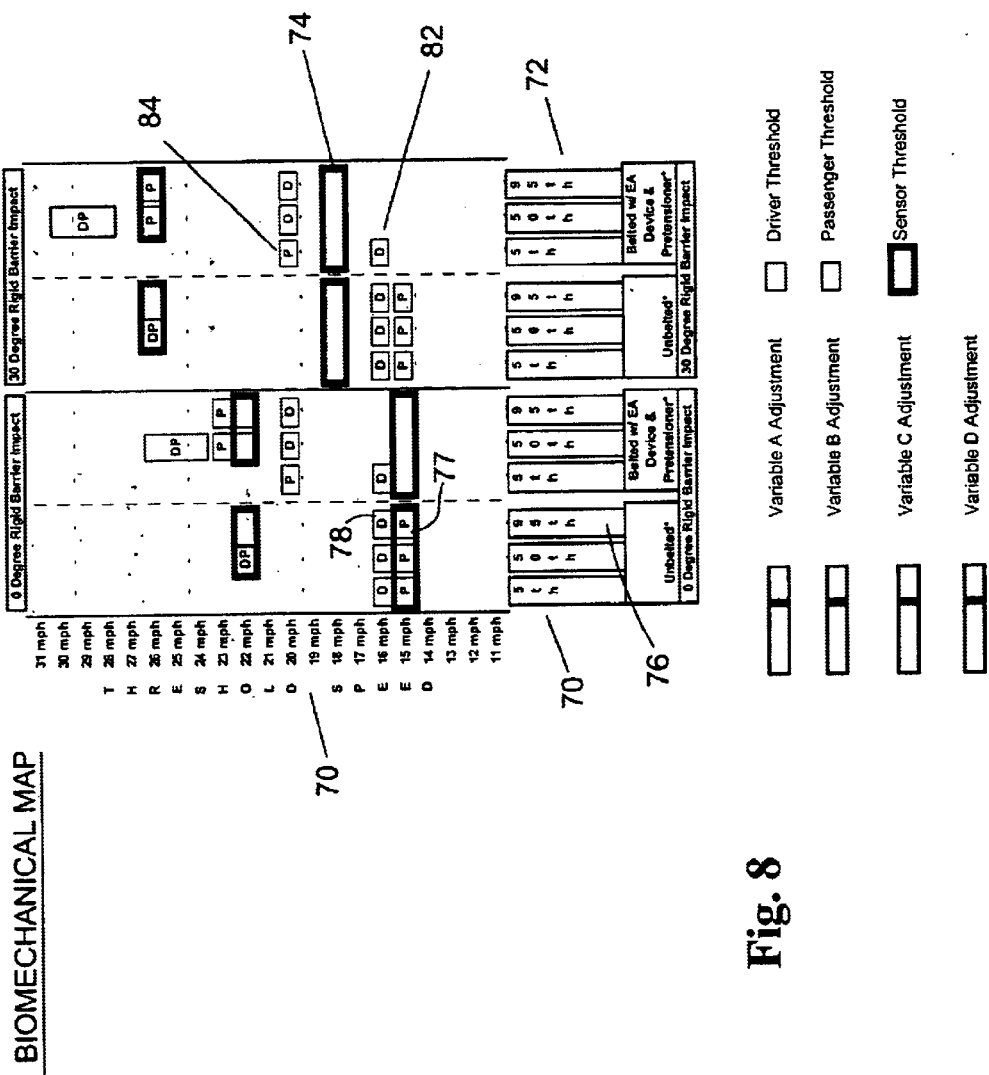
FIG. 8 depicts a second output of one link on the outputs of the design of experiments graphical user interface.

With regard to FIG. 8, a screen display of a biomechanical map of a particular vehicle during front 21 crash scenarios is represented. On the left-hand axis 70, is represented a series of possible threshold speeds for the deployment of high and low airbag inflator outputs or pretensioners. Along the lower horizontal axis are described the varying types of occupants in belted and unbelted stages that can be tested 72. For a given set of restraint factors, as well as real crash threshold information, sensor thresholds 74 are provided. For a given occupant, for example a $95^{th}$ percentile male in an unbelted crash into a 0° barrier impact 76, two values are shown. The first is with respect to the passenger 77 and the second is with respect to the driver 78. The markers 77 and 78 represent locations where there is a "must fire" situation for a given vehicle. As can be seen, the sensor threshold is below the must fire threshold for an unbelted $95^{th}$ percentile male in either the driver or passenger situation, at about 15 miles per hour.

When investigating a $95^{th}$ percentile male in an unbelted condition at a 30° rigid barrier impact, it can be seen that the sensor threshold 74 is higher for this crash than the must fire threshold values for driver 82 and the passenger 84. The system allows for a user to adapt the restraint factors to adjust the outputs for these given occupants and will be able to evaluate the effect of the changes on the occupant responses for all occupants and crash scenarios shown on the biomechanical map. The user can return to the screen (see FIG. 7) to evaluate the changes to the response of the system.

Instantaneous evaluation of all occupants in all crash situations is now possible without the need for costly and time-consuming testing. As can be seen, it is possible to determine which of the injury criteria will most significantly affect the overall passing or failure of the occupant's response with the system. Accordingly, it is possible to make a determination whether the injury criteria is "important" and also what possible remedies can be done to fix the problem. For instance, when it is determined that the head HIC value is slightly above the specification value, it may be possible to reduce the amount of pressure within the air bag to reduce the value of this injury criterion. Further, should the model for some reason not correlate on a particular injury value with the vehicle crashes 24 or the sled tests 25 (for example neck flexion), this value can be removed from the equation and the system evaluated. As such, those skilled in the art would easily be able to glean from the data the possible choices of outputs to the restraint component designs.

Figure 9:
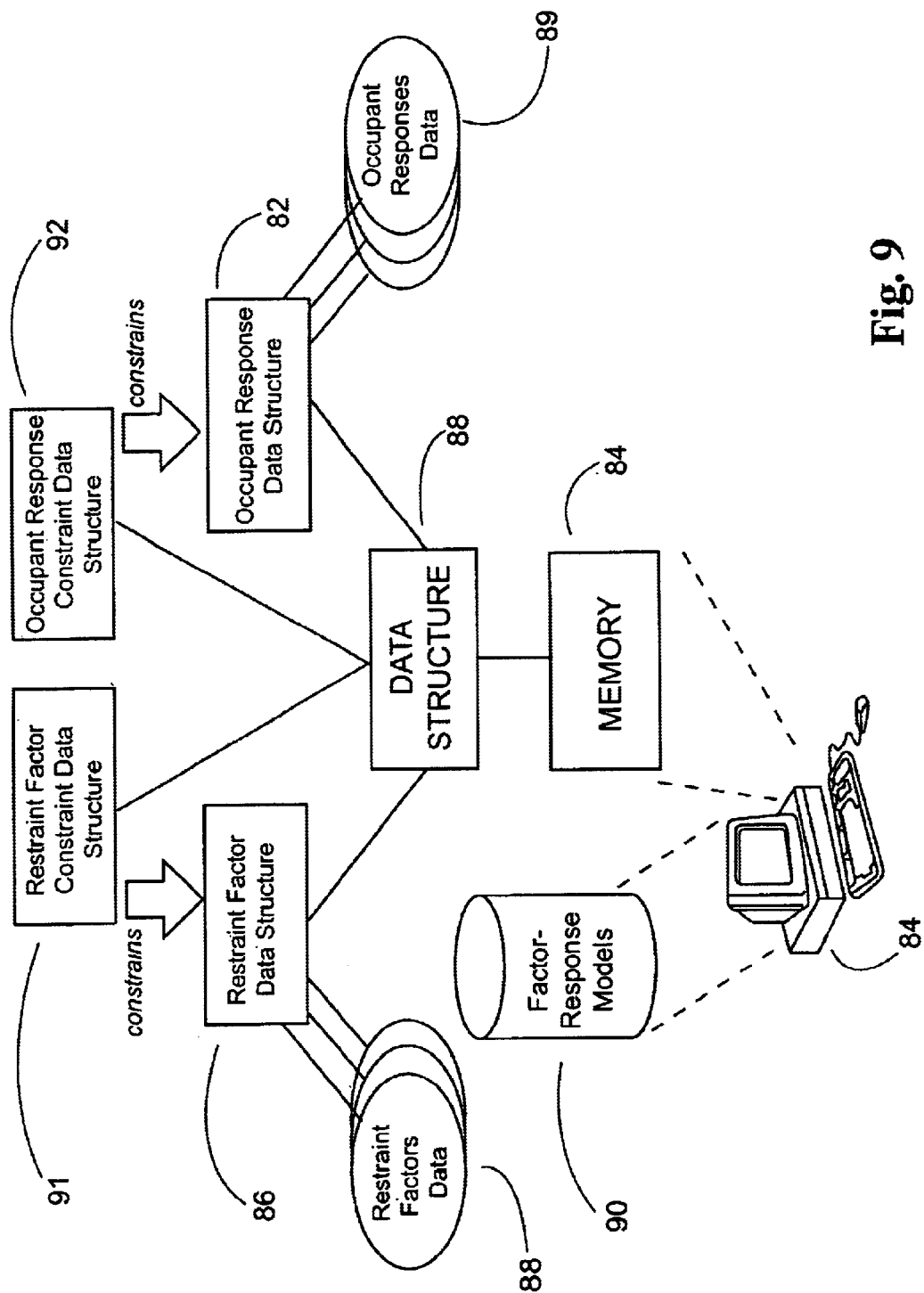
FIG. 9 is a schematic depicting the memory and data structure of the current invention.

FIG. 9 depicts the organization of memory of the present invention. The first computer 84 performs the vehicle factor and response calculations based upon the factor response models. These response calculation values are used to control the settings of the restraint factor response model, so that the desired occupant responses are achieved. The first computer 82 has a memory 84, which includes a data structure 85. The data structure 85 has a restraint factor data structure 86 and an occupant response data structure 87. The data structure 85 also includes restraint factor data 88 and occupant response data 89.

The restraint factor data structure 86 and occupant response data structure 87 have access to the factor response models 90, which are stored in a data base. The restraint factor data structure 86 includes restraint factors such as seat belt tension, air bag inflator pressure and temperature and size, as well as vehicle interior stiffness. The occupant response data structure 82 stores responses of an occupant for a different kind of situation such as HIC, chest G's, or Femur loads. Values for the restraint factor data structure 86 and occupant response data structure 82 are limited to actual real world values by the restraint factor constraint data structures 91 and occupant response constraint data structure 92.

The embodiments that have been set forth above were for the purpose of illustration and were not intended to limit the invention. It will be appreciated by those skilled in the art that changes or the modifications may be made to the embodiments discussed in the specification without departing from the spirit and scope of the invention as defined by the depended claims.

What is claimed:

1. A safety restraint design controller for controlling the design of a safety restraint system so that a predetermined desired level of an occupant's response is produced, the controller comprising:

a database (88) for storing an occupant restraint factor response model (90), the model interrelating at least one predetermined restraint factor (88) with the occupant response (89), the restraint factors having a level that is indicative of setting values for controlling the deployable components of the safety restraint design;

a database engine connected to the database for determining a level for the occupant response (89) based upon the model and upon a first level of the restraint factors (88);

an optimizer connected to the database engine for determining a second level of the restraint factors (88), which produces the desired level of the occupant response based upon the desired level of the occupant response from the database engine;

whereby a safety restraint design is controlled based upon the determined second level of the restraint factors, which produces the desired level of the safety response; and wherein the model is based upon a design of experiments involving the restraint factors and the occupant response.

2. The safety restraint design controller of claim 1 wherein the model interrelates a plurality of restraint factors (88) with a plurality of occupant responses (89).

3. The safety restraint design controller of claim 2 wherein the optimizer constrains the permissible level ranges for the restraint factors and for the occupant responses (89) in determining a second level of the occupant restraint factors.

4. The safety restraint design controller of claim 2 further including a computer-human interface (84) for constraining the permissible level ranges for the restraint factors and for the occupant responses in determining a second level of the occupant responses.

5. The safety restraint design controller of claim 2 further containing a module for determining a second level of restraint factors.

6. The safety restraint design controller of claim 2 wherein the predetermined restraint factor is determined by conducting a vehicle barrier test.

7. The safety restraint design controller of claim 1 wherein the optimizer constrains the permissible level ranges (91) for the restraint factors and for the occupant responses (92) in determining a second level of the occupant restraint factors.

8. A computer implemented method for designing a safety restraint system so that a predetermined desired level of occupant responses produced, comprising the steps of:

storing an occupant restraint factor response model (90) in a computer storage medium (84), the model which is based upon a design of experiments involving restraint factors (88) and the occupant response (89) interrelates at least one predetermined restraint factor (88) with the occupant response (89), the restraint factors having a level that is indicative of setting values for response output for components within the design of the restraint system;

determining a level for the occupant response (89) based upon the model and upon a first level of the restraint factors;

determining a second level of the restraint factors (88), which produces the desired level of the occupant response (89) based upon the determined level of the occupant response (89); and modifying the restraint system based upon the determined second level of the restraint factors (88), which produces the desired level of the occupant response (82).

9. The computer implemented method for designing a safety restraint system of claim 8 wherein the model includes interrelating a plurality of restraint factors (86) with a plurality of occupant responses (89).

10. The computer implemented method for designing a safety restraint system of claim 8 further comprising the step of: constraining the permissible level of the plurality of the restraint factors (88) and for the plurality of occupant responses in determining a second level of the occupant responses (89).

11. The computer implemented method for designing a safety restraint system of claim 8 wherein a computer-human interlace (84) is used for constraining the permissible level ranges for the restraint factors and for the occupant responses in determining a second level of the occupant responses.

12. The computer implemented method for designing a safety restraint system of claim 8 further including the step of:

determining a second level of the restraints factors.

13. A computer implemented method for controlling the design of an occupant restraint system so that a predetermined desired level of occupant response is produced, comprising the steps of:

(a) storing an occupant restraint factor-response model in a computer storage medium (84), the model interrelating at least one predetermined restraint factor (88) with the occupant response (89), the restraint factors having a level that is indicative of setting values for controlling the design of the occupant restraint system;

(b) establishing at least one constraint for the model based upon the desired level of the occupant response;

(C) determining the level of the restraint factors that produce the desired level of the restraint response based upon the model having the established constraint; and (d) controlling the design of an occupant restraint system based upon the determination level of the restraint factors that produces the desired level of the occupant response (89).

14. The computer implemented method for controlling the design of an occupant restraint system of claim 13 wherein the model having the established constraints includes having a level of at least one restraint factor restrained.

15. The computer implemented method for controlling the design of an occupant restraint system of claim 13 wherein the model includes interrelating a plurality of restraint factors with a plurality of occupant restraint factors (89).

16. In a safety restraint design controller for controlling the design of a safety restraint system in using a restraint model having a graphical user interface, a method of providing and selecting from a menu on the display, the method comprising:

retrieving a set of menu entries from the menu, each menu entry representing a occupant restraint characteristic of the model;

displaying the set of menu display options on the display;

receiving a menu entry selection signal indicative of the selection device pointing at a selected menu entry from the set menu entries;

in response to the signal, performing a search of a database for injury data corresponding to the occupant response represented by the selected menu entry;

displaying a second set of menu display options on the display indicative of an occupant restraint characteristic of the restraint model; and receiving a second menu entry selection signal indicative of the selection device pointing at a second selected menu entry from the second set menu entries.

17. The method of providing and selecting from a menu on the display of claim 16 further including the step of displaying the injury data produced by the restraint model.

* * * * *